United States Patent
von Helf (10) Patent No.: US 9,728,944 B2
(45) Date of Patent: Aug. 8, 2017

(54) PULL STRING ADVANCING TOOL

(71) Applicant: Preston von Helf, Yucaipa, CA (US)

(72) Inventor: Preston von Helf, Yucaipa, CA (US)

( * ) Notice: Subject to any disclaimer, the term of this patent is extended or adjusted under 35 U.S.C. 154(b) by 0 days.

(21) Appl. No.: 15/081,886

(22) Filed: Mar. 27, 2016

(65) Prior Publication Data

US 2016/0301197 A1    Oct. 13, 2016

Related U.S. Application Data

(60) Provisional application No. 62/146,918, filed on Apr. 13, 2015.

(51) Int. Cl.
*H02G 1/00* (2006.01)
*H02G 1/08* (2006.01)

(52) U.S. Cl.
CPC .................... *H02G 1/083* (2013.01)

(58) Field of Classification Search
CPC ...... B25B 11/002; B25B 11/00; B25B 11/007
See application file for complete search history.

(56) References Cited

U.S. PATENT DOCUMENTS

| | | | |
|---|---|---|---|
| 3,078,073 A | 2/1963 | Zizzo | |
| 3,971,543 A | 7/1976 | Shanahan | |
| 4,527,775 A | 7/1985 | Flowers | |
| 5,522,630 A | 6/1996 | James | |
| 7,051,999 B2 | 5/2006 | Hewitt | |
| 7,093,822 B2 | 8/2006 | Welker | |
| 8,214,986 B2* | 7/2012 | Kicksee | B60C 29/007 206/372 |
| 2007/0267879 A1 | 11/2007 | Hardin | |
| 2008/0048160 A1* | 2/2008 | Kim | H02G 1/085 254/134.3 FT |
| 2009/0108243 A1* | 4/2009 | Dasbach | B23K 37/0408 254/131 |
| 2016/0301197 A1* | 10/2016 | von Helf | H02G 1/083 |

* cited by examiner

*Primary Examiner* — Lee D Wilson
(74) *Attorney, Agent, or Firm* — Kenneth Avila (57) ABSTRACT

Disclosed is a system comprising an apparatus and method to aid electricians or other workers desiring to pass a wire, cord, or other such material through an inaccessible area inside a wall, above a ceiling, or below a floor of a residential home or commercial building. The apparatus consists of two elastic poles with the first pole containing a magnet at its distal end and the second pole containing a void space along its longitudinal axis wherein a string of a length substantially longer than the length of the second pole is passed through the string having a magnet at one end so when fully passed through the magnet is at the distal end of the second pole. The method comprises the steps of passing the first pole through a first opening cut into the wall, ceiling, or floor; passing the second pole through a second opening cut into the wall, ceiling, or floor; manipulating first and second poles such that the magnets on their distal ends magnetically bond with each other; withdrawing first pole from first opening so that the string defines a path between the openings where a wire may be drawn through.

6 Claims, 7 Drawing Sheets

PULL STRING ADVANCING TOOL

CROSS-REFERENCE TO RELATED APPLICATIONS

This application claims priority from U.S. Provisional Patent Application No. 62/146,918 filed on Apr. 13, 2015. The entire disclosure of the prior application is considered to be part of the disclosure of the accompanying application and is hereby incorporated by reference.

BACKGROUND OF THE INVENTION

1. Field of the Invention

The present invention relates to a magnetic wire pulling system for use in routing electrical wires through walls; and more particularly to a method and means for the installation of new or additional telecommunication wires, optical cables or electrical wiring in difficult to access areas such as below floors, above ceilings, and within attics, walls and furred out columns in finished homes or office buildings, while minimizing the need for patch holes or cutting pathways in the sheetrock used to finish the wall.

2. Description of the Related Art

Installing electrical wiring behind walls, above ceilings, and beneath floors is a frustrating and potentially dangerous task for electricians as many times the installation requires the movement and positioning of wire through enclosed spaces that are inaccessible to human senses of touch and sight. Often, a wire must be fed through a first opening and then somehow caught by the electrician's fingers or with the electrician's pliers and pulled through a second opening. Inserting fingers into a dark enclosed space potentially containing nails, pipes, and other hazards may lead to injury. The presence of exposed electrical wiring within these spaces may result in extreme injury or even death when fingers or metallic pliers are used to catch the wire. Many times the path a wire must take from one opening to a second opening is blocked by a bearing member of the structure's frame such as joists within the ceiling or flooring as well as cripples within the walls. Moving a wire between joists or cripples in a finished structure is time consuming and requires additional patch holes to be created so the electrician has access to spaces that are completely enclosed.

A number of patent applications disclosing various systems have been filed with the object of facilitating the movement of wire from a first opening to a second opening through an enclosed space in a finished house or building. A sampling of related patent applications follows.

U.S. Pat. No. 3,078,073 to T. J. Zizzo discloses one such system. The electrical wire is attached to a conductor holder with a screwed fastener and inserted through a first wall opening for an electrical outlet. The top portion of the conductor holder carries a powerful permanent magnet. A flexible string is attached to a plumb bob, termed "sensor", made from a magnetically attractable material such as steel is lowered from the attic in the same bay. When the sensor element comes in close proximity with the permanent magnet, it is attracted and is held securely by the permanent magnet. Pulling on the flexible string then drags the conductor holder upward within the bay. If excessive force is used during the lifting of the conductor holder, obstacles engage the conductor holder, or if the electrical wire attached to the conductor holder offers excessive resistance, the magnet force connecting the conductor holder to the sensor may be cancelled separating the conductor holder and sensor. Operational reliability thus presupposes lack of resistance of the wire to the pulling process, which is oftentimes not present during all installation conditions. In addition, this system is only useful in allowing an operator to position the line or wire from an upper location to a lower location as the flexible string has no structural rigidity.

U.S. Pat. No. 3,971,543 to Shanahan discloses system similar to the patent to Zizzo above. Disclosed is a device containing a chain formed from spherical elements connected by studs with a magnetically attractable body at one end of the chain and an eyelet at the opposing end of the chain. The chain can swing readily to contact a magnet. A flexible string is attached to the eyelet and the device is dropped into a bay within the wall. Meanwhile a magnet body is inserted into an opening in the wall that contains a magnet. As the device is lowered into the bay the chain may be swung about by a side to side movement by the electrician lowering the flexible string to facilitate connection if an offset exists from where the devices is dropped and the wall opening. When the magnetically attractable body at one end of the chain makes contact with the magnet body inserted through the wall opening the device may be pulled through the wall opening along with the flexible string. A wire may then be attached to the flexible string and pulled down to the wall opening or conversely up through the wall opening. The success of pulling a wire with the Shanahan system should be better than the Zizzo system as the attachment strength in Shanahan should be stronger than the attachment strength in Zizzo. However, obstacles may still prevent the lowering of the device moreover this system is only useful in allowing an operator to position the line or wire from an upper location to a lower location as the flexible string has no structural rigidity.

U.S. Pat. No. 4,527,775 to Flowers disclose a system for installing a conduit. A tape with a magnetically attractable roller is first inserted through an opening in an attic. The tape is guided to its destination behind a wall, using an electromagnet mounted on wheels, which rides on the interior wall. The electromagnet attracts the roller carrying the tape and guides it downward to its destination as the electromagnet is moved. Once the tape is brought through, a wire is firmly attached to the tape and is pulled up through the attic behind the wall. The electromagnet does not contact the interior wall, since it is riding on the rollers. As a result, the distance between the electromagnet and the magnetically attractable roller is larger than the thickness of sheetrock weakening the magnetic attraction between the electromagnet and the magnetically attractable roller. Any increase in this distance due to debris within the wall further reduces this magnetic attraction rendering the system unless. Moreover, the electromagnet requires a power source which may be difficult to obtain as electrical power is shutdown as a precaution to prevent injury to electricians. Finally, this system is not useful in applications where a joist or cripple blocks the path to be taken by the roller.

U.S. Pat. No. 5,522,630 to James discloses a fishing tool for magnetic objects. The tool consists of an electromagnet powered by a variable power DC battery source. In one embodiment, an electromagnet is attached to a string using an eyelet formed on the electromagnet. The assembly is lowered from an upper hole into a bay between joists disposed behind a sheetrock or plaster wall. A magnetizable fish tape is inserted in a lower hole in the same bay, and the electromagnet is energized using the variable DC power supply. The electromagnet attached to the string attracts and captures the fish tape. Each of the fish tape and the electromagnet is pulled through the lower hole, completing the string up operation. In a second embodiment, the fish tape is secured to a slot in the fishing tool, and is held by screws. The fishing tool, with the attached fish tape, is pushed up through the conduit from the lower hole and energized by the variable power DC source. A magnetizable fishing tape is inserted from the top to contact the energized fishing tool and capture it. The fishing tape together with the fishing tool is pulled through the upper hole. Both embodiments rely on a secure attachment between the energized electromagnet and magnetizable fish to complete the fishing operation. Since the electromagnet used in the first embodiment is heavy and carried by a flexible string, it can swing and may not easily contact the inserted fish tape at the lower hole, especially if the upper and lower holes are not aligned in a vertical plane. In the second embodiment, the heavy electromagnet is essentially carried by the fish tape, attached by screws in an asymmetric configuration, and has to carry the electrical leads. This configuration allows bending and collapse of the fish tape. It may not be inserted vertically, thereby impairing its ability to contact the inserted magnetizable fish tape at the upper hole. With either embodiment, the magnetizable object and the electromagnet must be in close proximity to create contact. In addition, the electromagnet must sustain the weight of the electromagnet and fish tape during pull. Such sustained contact is oftentimes not readily accomplished, and requires a high current that is not easily provided by a battery power source. Finally, as in the preceding disclosures, this system is not useful in applications where a joist or cripple blocks the path to be taken by the electromagnet.

U.S. Pat. No. 7,051,999 to Hewitt is similar to the Flowers patent except that rather than an electromagnet mounted on wheels Hewitt uses a permanent magnet coated with a low friction surface finish and rather than a magnetically attractable roller Hewitt uses a magnetic "mouse". The magnetic mouse is dropped into a wall bay and driven by the permanent magnet to the desired wall opening. The magnetic mouse trails a string that is then used to pull a wire along the path followed by the magnetic mouse. By removing the wheels Hewitt is able to minimize the distance between the permanent magnet and the magnetic mouse. In addition, by using a permanent magnetic Hewitt's device does not require access to an electrical power source. However, there remains the problem of debris within the wall that may block the path to be taken by the magnetic mouse. Moreover, the permanent magnetic can be very expensive and its weight may make it difficult to drive the magnetic mouse across a ceiling. Finally, as in the preceding disclosures, this system is not useful in applications where a joist or cripple blocks the path to be taken by the magnetic mouse.

U.S. Pat. No. 7,093,822 to Welker discloses a variety of tools that may be used to guide a string from one opening to another. The tools comprise a retrieval tool, a manual release tool, an insertion tool, an automatic release tool, a transfer tool, an extensible prop, and a telescoping pole with magnet. The tools deliver a magnet into the structure of a house, retrieve a magnet from the structure, or transfer a magnet from one tool to another tool. The telescoping pole with magnet is the most similar tool to the present invention. The telescoping pole has a series of tubular sections with each section being of slightly smaller diameter than the previous section thus being able to slide into the previous section. The first and widest section contains a reel system whereon string may be collected. The string passes through each of the sections and is terminated by a magnet. The telescoping pole may be used to pull string above the ceiling, below the floor, and within the wall. The telescoping pole is fully extended and inserted into the first opening. Through the second opening a magnet with an eyelet is positioned and a string is attached to the eyelet. The magnet at the end of the telescoping pole makes contact with the magnet with the eyelet. The operator then pulls the magnet with the eyelet by use of the reel in the telescoping pole thereby drawing the string attached to the eyelet. The telescoping pole is a complex tool with many parts thus being prone to breakage. Moreover, as the distance to be covered from one opening to the other is great the pole, when fully extended, is unwieldy and subject to bending due to gravitational effects. The opening for the pole must be large to accommodate the length of the extended pole. Finally, when inserting the pole, if the tip of the pole encounters an obstacle then the sections of the pole will collapse one into another defeating the purpose of the pole especially when joists, cripples, or even weather insulation material is encountered by the pole.

The present invention solves a number of problems found in the prior art. The present invention is lightweight and of a simple design consisting of only a few parts and is very inexpensive to fabricate. This simple design makes the tool more durable and impervious to mechanical defects than the prior art due to the lack of mechanical members and connections such as a telescoping pole in Welker. Durability is a key factor to consider when pulling wires through existing construction due to the need of overcoming resistance forces and tolerating strong pulling and pushing forces. The present invention does not require any electrical power source and does not conduct electricity thereby protecting operators from electrical shock. The present invention may be used for drawing a pull string in horizontal as well as vertical applications. Finally, the present invention is designed to operate through small openings that are created in a joists, studs, top plates, fire blocks, or cripples.

The design also has measurement marking which allows for precise operation in unseen areas. The present invention does not require any electrical power source. The present invention may be used for drawing a pull string in horizontal as well as vertical applications. Also, the present tool is fully insulated to protect from electrical shock. Finally, the present invention is designed to operate through small openings that are created in a joists, studs, top plates, fire blocks, or cripples.

BRIEF SUMMARY OF THE INVENTION

The present invention consists of two poles. The first pole is solid and has at one end a magnet. The second pole is hollow so that a string may pass therein. The string is of greater length then the second pole and has at one end a magnet. The string is passed through the second pole so that the magnet is at one end of the pole and the excess string extends from the opposing end of the pole.

Where it is desired to move a wire from one opening to another a first and second opening are cut into the wall, ceiling, or floor at their desired locations. The two poles are then inserted into their respective opening by two operators and manipulated so that their magnetic tips make contact. Once the magnetic tips make contact the operator of the first pole withdraws the pole from the opening along with the string that previously was within the second pole while the operator of the second pole withdraws the second pole. When both poles have been withdrawn the string will exist from one opening to the other allowing for a wire to be attached and pulled from one hole to the other.

Where it is desired to move a wire from one opening to another and an intervening joist or cripple exists between the two openings the first and second opening are cut into the wall, ceiling, or floor at their desired locations and sized so that a drill may be brought to act upon the joist or cripple so that a hole is created therein. The two poles are then inserted into their respective opening by two operators with either the first or second pole passing through the hole within the joist or cripple and both poles manipulated so that their magnetic tips make contact. Once the magnetic tips make contact the operator of the first pole withdraws the pole from the opening along with the string that previously was within the second pole while the operator of the second pole withdraws the second pole. When both poles have been withdrawn the string will exist from one opening, through the hole within the joist or cripple, to the other opening allowing for a wire to be attached and pulled from one hole to the other.

Where it is desired to move a wire from one opening to another and there are two intervening joists or cripples that exist between the two openings the first and second opening are cut into the wall, ceiling, or floor at their desired locations and sized so that a drill may be brought to act upon the joist or cripple closest to the opening so that a hole is created therein. The two poles are then inserted into their respective opening by two operators with each pole passing through the respective hole drilled for them. After the two poles pass through the joists or cripples they are maneuvered by their operator so that the magnetic tips make contact. Once the magnetic tips make contact the operator of the first pole withdraws the pole from the opening along with the string that previously was within the second pole while the operator of the second pole withdraws the second pole. When both poles have been withdrawn the string will exist from one opening, through the holes within the joists or cripples, to the other opening allowing for a wire to be attached and pulled from one hole to the other.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

Neither this summary nor the following detailed description defines or limits the invention. The invention is defined by the claims.

BRIEF DESCRIPTION OF DRAWINGS

The present invention will become more fully understood from the detailed description and accompanying drawings, wherein.

DETAILED DESCRIPTION OF THE INVENTION

The following description of the preferred embodiment(s) is merely exemplary in nature and is in no way intended to limit the invention, its application, or uses.

Figure 1:
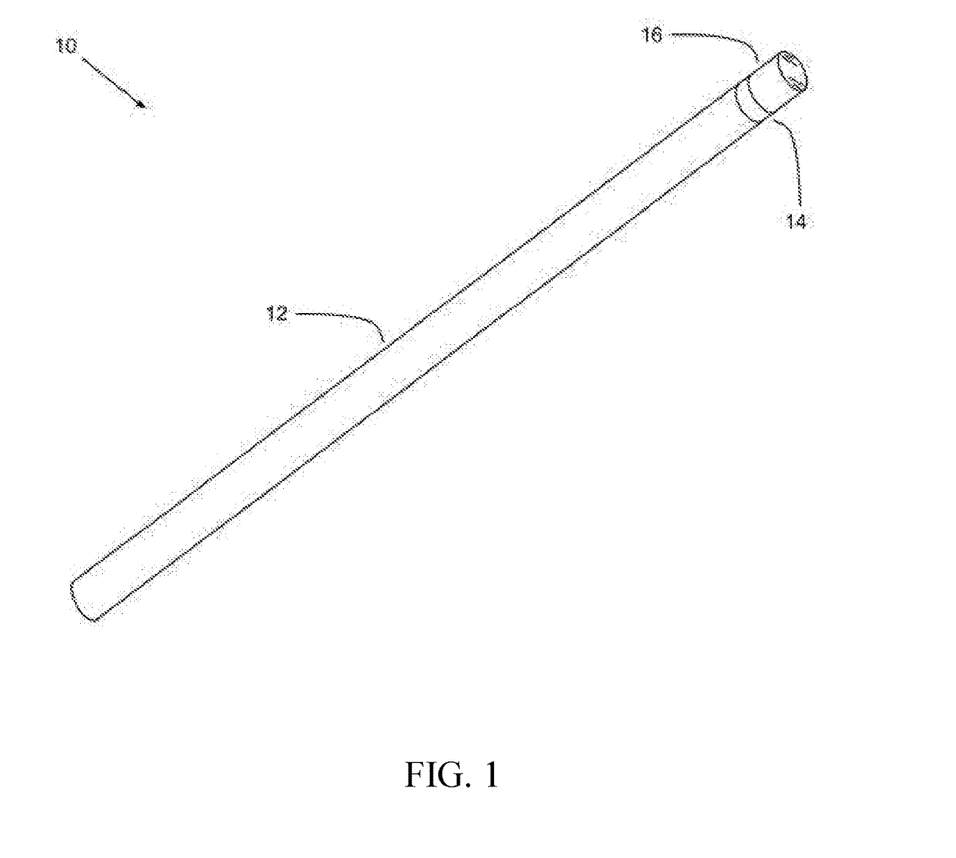
FIG. 1 is a perspective view of the first pole of the present invention.

FIG. 1 shows a perspective view of a first embodiment of first pole 10. First pole 10 is comprised of shaft 12, magnet 16, and attachment device 14. Shaft 12 is cylindrical in design and may be hollow or solid and ranges from six to 120 inches in length. Shaft 12 most important attribute is that it is to a large degree elastic returning back to its original shape after the application of stress forces to maneuver first pole 10 through openings cut through sheetrock and holes drilled into joists and cripples. As such shaft 12 may be fabricated from a variety of materials that exhibit such elasticity such as but not limited to fiberglass, carbon fiber, and some forms of plastic. At the far end of first pole 10 is cylindrical magnet 16 and may be coated with a nonconductive material to prevent magnet 16 from becoming electrified or from chipping, shattering, or otherwise breaking apart when attracting magnet 28 to itself. Attachment device 14 is used to permanently attach magnet 16 to shaft 12 and may use various means such as adhesives or mechanical crimping mechanisms to accomplish this requirement.

Figure 2:
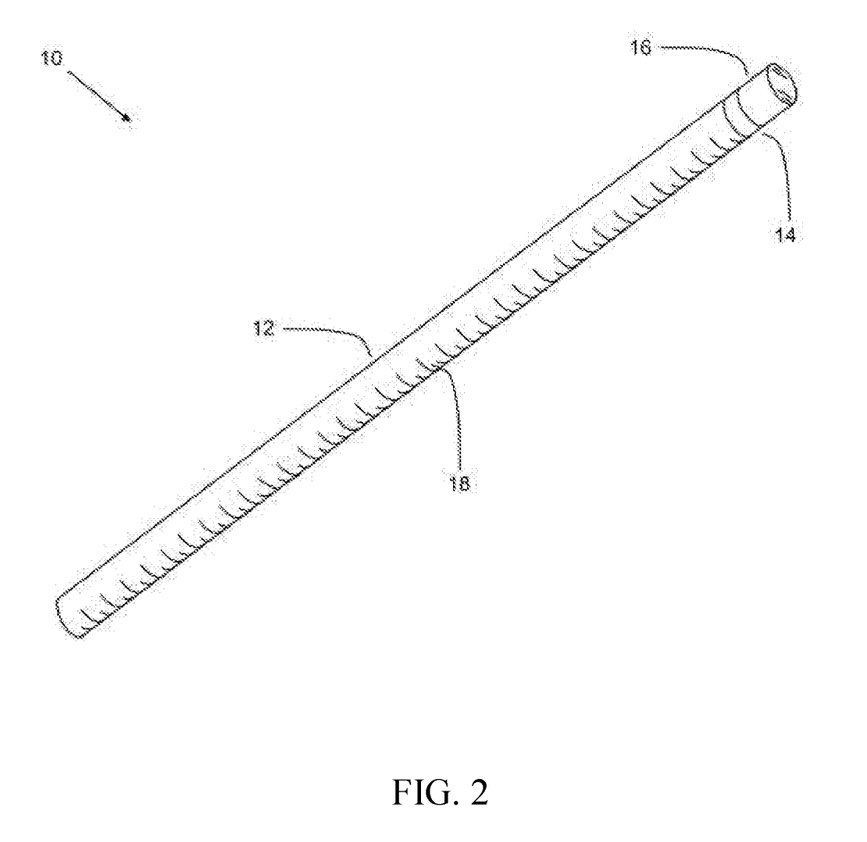
FIG. 2 is a perspective view of the first pole of the present invention with measurement markings.

FIG. 2 shows a perspective view of a second embodiment of first pole 10. In this embodiment first pole 10 is comprised of shaft 12, magnet 16, attachment device 14, and contains measurement markings 18. Shaft 12 is cylindrical in design and may be hollow or solid and ranges from six to 120 inches in length. Shaft 12 most important attribute is that it is to a large degree elastic returning back to its original shape after the application of stress forces to maneuver first pole 10 through openings cut through sheetrock and holes drilled into joists and cripples. As such shaft 12 may be fabricated from a variety of materials that exhibit such elasticity such as but not limited to fiberglass, carbon fiber, and some forms of plastic. At the far end of first pole 10 is cylindrical magnet 16 and may be coated with a nonconductive material to prevent magnet 16 from becoming electrified or from chipping, shattering, or otherwise breaking apart when attracting magnet 28 to itself. Attachment device 14 is used to permanently attach magnet 16 to shaft 12 and may use various means such as adhesives or mechanical crimping mechanisms to accomplish this requirement. Measurement markings 18 is used by the operator of first pole 10 to accurately determine the distance first pole 10 has penetrated behind the ceiling, flooring, or wall.

Figure 3:
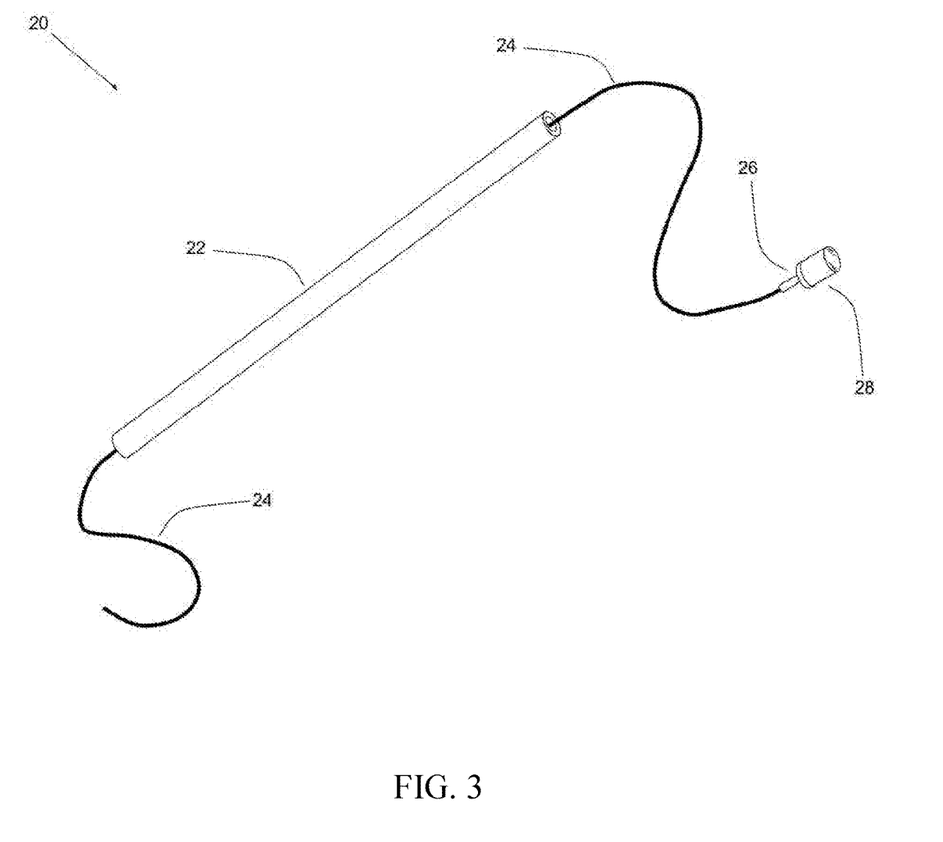
FIG. 3 is a perspective view of the second pole of the present invention.

FIG. 3 shows a perspective view of a first embodiment of second pole 20. Second pole 20 is comprised of shaft 22, magnet 28, attachment device 26, and string 24. Shaft 22 is cylindrical in design, substantially hollow, and ranges from six to 120 inches in length. Shaft 22 most important attribute is that it is to a large degree elastic returning back to its original shape after the application of stress forces to maneuver second pole 20 through openings cut through sheetrock and holes drilled into joists and cripples. As such shaft 22 may be fabricated from a variety of materials that exhibit such elasticity such as but not limited to fiberglass, carbon fiber, and some forms of plastic. String 24 is significantly longer than the length of shaft 22 and at one end is attached to magnet 28 by attachment device 26. Magnet 28 is cylindrical in shape may be coated with a nonconductive material to prevent magnet 28 from becoming electrified or from chipping, shattering, or otherwise breaking apart when attracting magnet 16 to itself. Attachment device 26 is at one end permanently attached to magnet 28 by any one of various means such as adhesives or mechanical crimping mechanisms to accomplish this requirement and at its opposing end permanently or nonpermanently attached to string 24. If attachment device 26 is to be permanently attached to string 24 attachment device 26 may use any one of various means such as adhesives or mechanical crimping mechanisms to accomplish this requirement. If attachment device 26 is not to be permanently attached to string 24 attachment device 26 may use any one of various means such as clips or an eyelet to accomplish this requirement.

Figure 4:
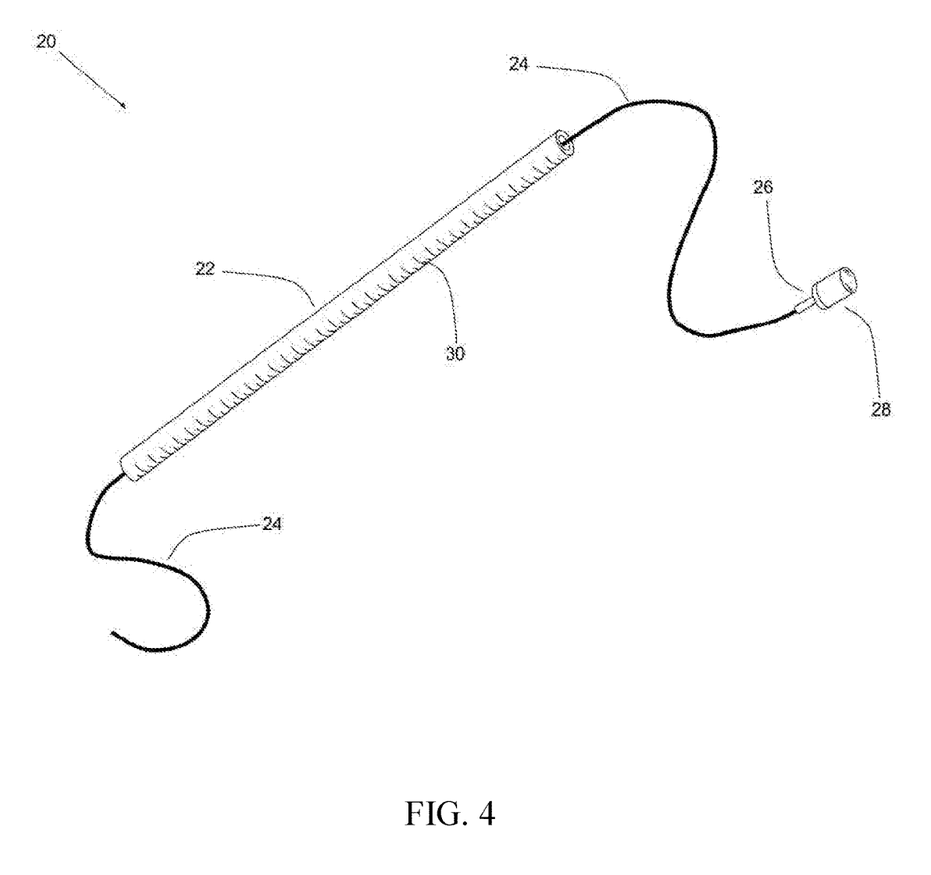
FIG. 4 is a perspective view of the second pole of the present invention with measurement markings.

FIG. 4 shows a perspective view of a second embodiment of second pole 20. In this embodiment second pole 20 is comprised of shaft 22, magnet 28, attachment device 26, string 24, and measurement markings 30. Shaft 22 is cylindrical in design, substantially hollow, and ranges from six to 120 inches in length. Shaft 22 most important attribute is that it is to a large degree elastic returning back to its original shape after the application of stress forces to maneuver second pole 20 through openings cut through sheetrock and holes drilled into joists and cripples. As such shaft 22 may be fabricated from a variety of materials that exhibit such elasticity such as but not limited to fiberglass, carbon fiber, and some forms of plastic. String 24 is significantly longer than the length of shaft 22 and at one end is attached to magnet 28 by attachment device 26. Magnet 28 is cylindrical in shape may be coated with a nonconductive material to prevent magnet 28 from becoming electrified or from chipping, shattering, or otherwise breaking apart when attracting magnet 16 to itself. Attachment device 26 is at one end permanently attached to magnet 28 by any one of various means such as adhesives or mechanical crimping mechanisms to accomplish this requirement and at its opposing end permanently or nonpermanently attached to string 24. If attachment device 26 is to be permanently attached to string 24 attachment device 26 may use any one of various means such as adhesives or mechanical crimping mechanisms to accomplish this requirement. If attachment device 26 is not to be permanently attached to string 24 attachment device 26 may use any one of various means such as clips or an eyelet to accomplish this requirement. Measurement markings 30 is used by the operator of second pole 20 to accurately determine the distance second pole 20 has penetrated behind the ceiling, flooring, or wall.

Figure 5:
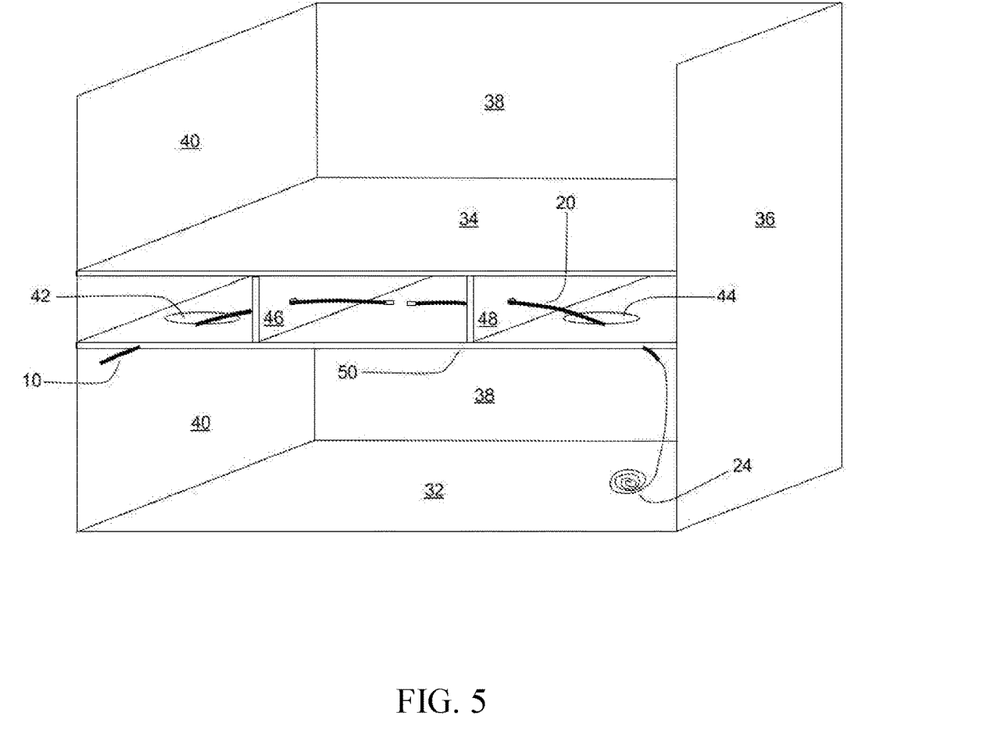
FIG. 5 is a perspective view showing the first and second pole in operation to establish a path for a string through two joists in a ceiling application.

FIG. 5 shows first pole 10 along with second pole 20 being use to position string 24 from first opening 42 to second opening 44 in a ceiling so that an electrical wire or cable may subsequently pulled by string 24 from first opening 42 to second opening 44. The front wall and roof have been eliminated from this illustration in order to better demonstrate how first pole 10 and second pole 20 function together to draw string 24 from first opening 42 to second opening 44. Moreover FIG. 5 is not to scale. Shown in FIG. 5 is left wall 40, right wall 36, and rear wall 38 identifying the extent of this structure. Above first floor 32 is ceiling 50 and second floor 34. Between ceiling 50 and second floor 34 are joists 46 and 48. There arises a need to draw a wire from first opening 42 to second opening 44 however in many structures joists 46 and 48 prevent the drawing of a wire from first opening 42 to second opening 44. Even if holes are drilled into joists 46 and 48 it would be time consuming and difficult to draw a wire from first opening 42 through holes in joists 46 and 48 as the space between joists 46 and 48 is enclosed. Using the present invention, a first operator will insert first pole 10 into first opening 42 and through hole in joist 46. A second operator will insert second pole 20 into second opening 44 and through hole in joist 48. By the operators maneuvering first pole 10 and second pole 20 within the enclosed space between joists 46 and 48 magnet 16 at the tip of first pole 10 and magnet 28 at the tip of second pole 20 will at some point become magnetically attracted and form a magnetic bond with each other. At this time the first operator will remove first pole 10 thus drawing string 24 through hole in joist 46 and out through first opening 42 establishing a complete path for string 24 from first opening 42 to second opening 44. The appropriate wire is then attached to one end of string 24 and is drawn from one opening to the other by pulling on string 24 from the opposite opening.

Figure 6:
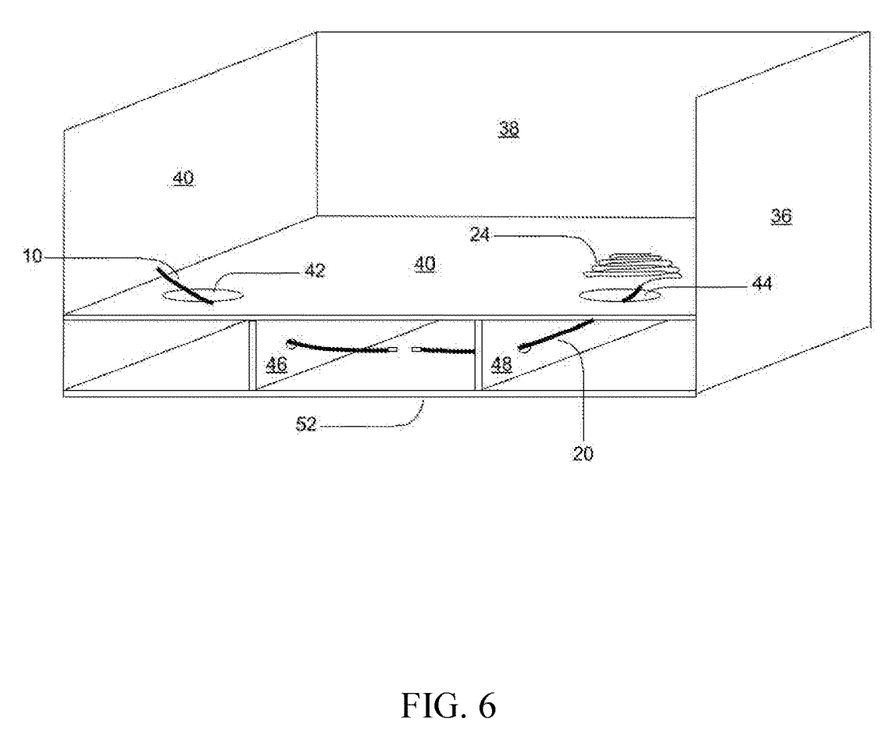
FIG. 6 is a perspective view showing the first and second pole in operation to establish a path for a string through two joists in a flooring application.

FIG. 6 shows first pole 10 along with second pole 20 being use to position string 24 from first opening 42 to second opening 44 in a flooring so that an electrical wire or cable may subsequently pulled by string 24 from first opening 42 to second opening 44. The front wall and ceiling have been eliminated from this illustration in order to better demonstrate how first pole 10 and second pole 20 function together to draw string 24 from first opening 42 to second opening 44. Moreover FIG. 6 is not to scale. Shown in FIG. 6 is left wall 40, right wall 36, and rear wall 38 identifying the extent of this structure. Below floor 32 is foundation 52 and between floor 34 and foundation 52 are joists 46 and 48. There arises a need to draw a wire from first opening 42 to second opening 44 however in many structures joists 46 and 48 prevent the drawing of a wire from first opening 42 to second opening 44. Even if holes are drilled into joists 46 and 48 it would be time consuming and difficult to draw a wire from first opening 42 through holes in joists 46 and 48 as the space between joists 46 and 48 is enclosed. Using the present invention, a first operator will insert first pole 10 into first opening 42 and through hole drilled into joist 46. A second operator will insert second pole 20 into second opening 44 and through hole drilled into joist 48. By the operators maneuvering first pole 10 and second pole 20 within the enclosed space between joists 46 and 48 magnet 16 at the tip of first pole 10 and magnet 28 at the tip of second pole 20 will at some point become magnetically attracted and form a magnetic bond with each other. At this time the first operator will remove first pole 10 thus drawing string 24 through hole in joist 46 and out through first opening 42 establishing a complete path for string 24 from first opening 42 to second opening 44. The appropriate wire is then attached to one end of string 24 and is drawn from one opening to the other by pulling on string 24 from the opposite opening.

Figure 7:
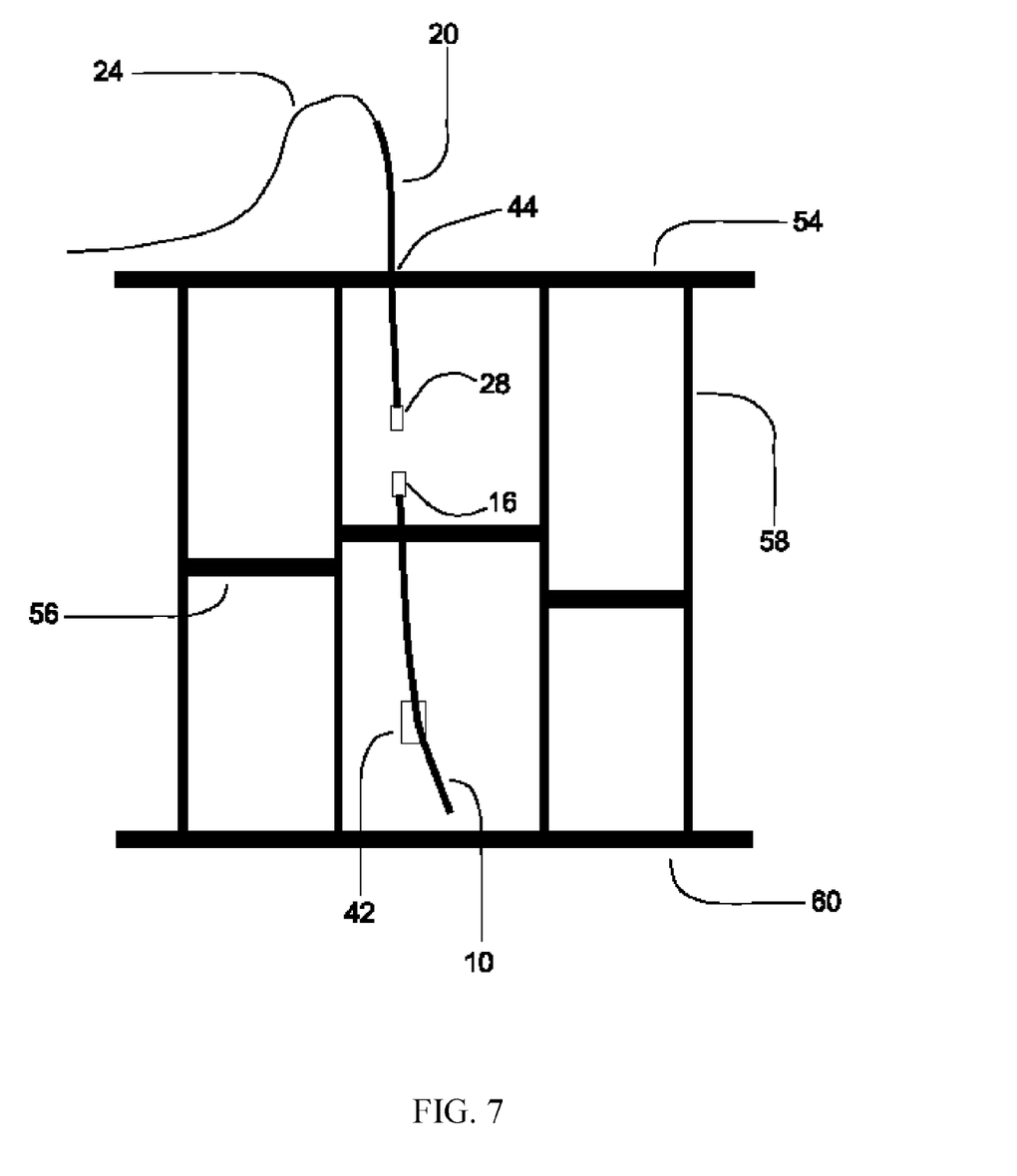
FIG. 7 is a planar view showing the first and second pole in operation to establish a path for a string through a fireblock and top plate within a wall.

FIG. 7 shows first pole 10 along with second pole 20 being use to position string 24 from first opening 42 to second opening 44 within a wall so that an electrical wire or cable may subsequently pulled by string 24 from first opening 42 to second opening 44. The front sheetrock has been eliminated from this illustration in order to better demonstrate how first pole 10 and second pole 20 function together to draw string 24 from first opening 42 to second opening 44. Moreover FIG. 7 is not to scale. Shown in FIG. 7 is top plate 54, bottom plate 60, multiple studs 58, and multiple fireblocks 56 that will be found within a wall in a conventional structure. First opening 42 is typically a wall receptacle cutout from the sheetrock and although the sheetrock has been removed from FIG. 7 the outline of first opening 42 is included to improve visualization of the present invention. In addition, second opening 44 is identified but is not visible due to the angular presentation of FIG. 7. Second opening 44 is typically created by drilling a hole through top plate 54. There arises a need to draw a wire from first opening 42 through second opening 44 however in many structures fireblock 56 and top plate 54 exist that prevent the drawing of a wire from first opening 42 through second opening 44. Even if holes are drilled into fireblock 56 and top plate 54 it would be time consuming and difficult to draw a wire from first opening 42 through holes in fireblock 56 and top plate 54 as the space between fireblock 56 and top plate 54 is enclosed. Using the present invention, a first operator will insert first pole 10 into first opening 42 and through hole drilled into fireblock 56. A second operator will insert second pole 20 into second opening 44 and through hole drilled into top plate 54. By the operators maneuvering first pole 10 and second pole 20 within the enclosed space between fireblock 56 and top plate 54 magnet 16 at the tip of first pole 10 and magnet 28 at the tip of second pole 20 will at some point become magnetically attracted and form a magnetic bond with each other. At this time the first operator will remove first pole 10 thus drawing string 24 through hole in top plate 54, hole in fireblock 56, and out through first opening 42 establishing a complete path for string 24 from first opening 42 to second opening 44. The appropriate wire is then attached to one end of string 24 and is drawn from one opening to the other by pulling on string 24 from the opposite opening.

The second embodiment of the present invention with measurement markings 18 and 30 function in the same manner but gains the advantage of using the measurement markings to determine the penetration of first pole 10 and second pole 20 into first opening 42 and second opening 44. In this way the operators may determine if the tips of first pole 10 and second pole 20 have passed each other within the enclosed space between joists 46 and 48.

First pole 10 and second pole 20 are fabricated from the same elastic material and typically are of the same length. Magnets are fabricated with a nonconductive coating to prevent the magnets from carrying an electrical charge or from breakage when being attracted to the opposing magnet. If measurement markings are to be added to first pole 10 and second pole 20 the process of fabricating the poles may laser print the measurement markings directly on the poles or decals containing the measurement markings may be applied to a fabricated pole. A magnet is then permanently attached to one end of first pole 10 by use of an adhesive or a mechanical crimping mechanism. A magnet is either permanently or nonpermanently attached to one end of string 24. If permanently attached, then an appropriate adhesive or a mechanical crimping mechanism may be used. If nonpermanently attached, then an eyelet at one end of the magnet may be used to attach string 24. Finally string 24 is passed through second pole 20 such that the magnet at the end of string 24 is at the far end of second 20 pole and the remaining string exiting from the near end of second pole 20.

What is claimed is:

1. A system for pulling wire through a space enclosed by walls, ceiling, floors, joists, fireblocks, or cripples of a house or other structure the system comprising:
    a first cylindrical pole containing first magnet at a distal end and a means of attaching first magnet to first pole;
    a second cylindrical pole containing a void along a longitudinal axis; and
    a string of a length substantially longer than second pole containing second magnet at a distal end and a means of attaching second magnet to said string
    whereby
        said string is threaded through second pole so that second magnet is at distal end of second pole;
        first pole is inserted through first opening in wall, ceiling, or floor;
        second pole is inserted through second opening in wall, ceiling, or floor;
        first and second poles are manipulated so that first and second magnets make contact; and
        first pole is withdrawn through first opening pulling said string threaded within second pole through first opening said string defining a path between first and second openings through which wire may be pulled by said string.

2. The system of claim 1 wherein said first and second poles are fabricated from a substantially elastic material.

3. The system of claim 2 where said elastic material is fiberglass, carbon fiber, or plastic.

4. The system of claim 1 wherein said first and second poles display measurement markings along their longitudinal axis.

5. The system of claim 1 where said first and second magnets are coated with a nonconductive material.

6. A system for pulling wire through a space enclosed by walls, ceiling, floors, joists, fireblocks, or cripples of a house or other structure the system comprising:
    a first cylindrical pole
        being elastic;
        displaying measurement markings along a longitudinal axis;
        containing first magnet at distal end coated with a nonconductive material; and
        means of attaching first magnet to first pole;
    a second cylindrical pole
        being elastic;
        displaying measurement markings along a longitudinal axis; and
        containing a void along a longitudinal axis
    a string
        of a length substantially longer than second pole;
        containing second magnet at distal end coated with a nonconductive material; and
        means of attaching second magnet to string;
    whereby
        said string is threaded through second pole so that second magnet is at distal end of second pole;
        first pole is inserted through first opening in wall, ceiling, or floor;
        second pole is inserted through second opening in wall, ceiling, or floor;
        first and second poles are manipulated so that first and second magnets make contact; and
        first pole is withdrawn through first opening pulling said string threaded within second pole through first opening said string defining a path between first and second openings through which wire may be pulled by said string.

* * * * *